United States Patent
Yi (10) Patent No.: US 9,383,519 B2
(45) Date of Patent: Jul. 5, 2016

(54) OPTICAL COMMUNICATION MODULE WITH FIBER SUBMOUNT AND LATCHING OPTICS ASSEMBLY

(71) Applicant: Avago Technologies General IP (Singapore) Pte. Ltd., Singapore (SG)

(72) Inventor: Robert Yi, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 149 days.

(21) Appl. No.: 13/707,740

(22) Filed: Dec. 7, 2012

(65) Prior Publication Data

US 2014/0161398 A1 Jun. 12, 2014

(51) Int. Cl.
*G02B 6/36* (2006.01)
*G02B 6/38* (2006.01)
*G02B 6/42* (2006.01)

(52) U.S. Cl.
CPC .............. *G02B 6/36* (2013.01); *G02B 6/3897* (2013.01); *G02B 6/4292* (2013.01); *G02B 6/4214* (2013.01); *G02B 6/4246* (2013.01)

(58) Field of Classification Search
CPC ... G02B 6/3897; G02B 6/4214; G02B 6/4292
USPC .......................................... 385/49, 52, 88–94
See application file for complete search history.

(56) References Cited

U.S. PATENT DOCUMENTS

| 5,781,682 | A  | * | 7/1998  | Cohen et al. ..................... 385/89 |
|-----------|----|---|---------|------------------------------------------|
| 6,086,263 | A  | * | 7/2000  | Selli et al. ........................ 385/88 |
| 6,386,768 | B1 | * | 5/2002  | Yoon et al. ....................... 385/88 |
| 6,398,424 | B1 | * | 6/2002  | Jin et al. .......................... 385/83 |
| 6,546,182 | B2 |   | 4/2003  | Calvet et al.                             |
| 6,685,363 | B2 |   | 2/2004  | Kryzak                                    |
| 6,722,791 | B2 | * | 4/2004  | Cheng et al. ..................... 385/83 |
| 7,373,031 | B2 | * | 5/2008  | Wang et al. ...................... 385/14 |
| 8,764,312 | B2 | * | 7/2014  | Wang et al. ...................... 385/77 |
| 8,989,539 | B2 | * | 3/2015  | Selli et al. ....................... 385/39 |
| 9,039,304 | B2 | * | 5/2015  | Ko ...................... G02B 6/4201 385/88 |
| 2006/0110109 | A1 |   | 5/2006  | Yi et al. |
| 2011/0268390 | A1 | * | 11/2011 | Yi et al. ........................... 385/50 |
| 2011/0310254 | A1 |   | 12/2011 | Barnes, IV et al. |
| 2012/0243837 | A1 | * | 9/2012  | Ko et al. .......................... 385/93 |
| 2014/0126957 | A1 | * | 5/2014  | Shi ....................... G02B 6/4246 403/322.1 |

FOREIGN PATENT DOCUMENTS

JP  2000056189  2/2000

* cited by examiner

*Primary Examiner* — Daniel Petkovsek (57) ABSTRACT

In an optical communication module, a fiber submount is mated with an optics assembly to optically align an optical fiber retained in a groove in the fiber submount with an optics element of the optics assembly. The fiber submount has a resiliently biased latch portion that engages the optics assembly to provide a resilient retaining force between the optics assembly and the fiber submount. The force retains the optics element in optical alignment with the fiber optical axis.

17 Claims, 6 Drawing Sheets

OPTICAL COMMUNICATION MODULE WITH FIBER SUBMOUNT AND LATCHING OPTICS ASSEMBLY

BACKGROUND

In an optical communication system, it is generally necessary to couple an optical fiber to an opto-electronic transmitter, receiver or transceiver device and to, in turn, couple the device to an electronic system such as a switching system or processing system. These connections can be facilitated by modularizing the device. Such optical modules include a housing in which are mounted opto-electronic elements, optical elements, and electronic elements. In a transceiver module, the opto-electronic elements commonly include one or more light sources, such as lasers, and one or more light detectors, such as photodiodes. The optical elements commonly include lenses and, in modules in which the optical paths are not linear, reflectors that redirect the optical beams. Electronic elements commonly include digital signal driver circuits for driving the lasers or other light sources and digital signal receiver circuits for processing the output of photodiodes or other light detectors.

Various optical transceiver module configurations are known. For example, a configuration commonly referred to as "Small Form Factor Pluggable" or SFP refers to a transceiver module having an elongated housing with a rectangular cross-sectional shape, where the rear of the module has an electrical connector that plugs into a bay of a front-panel cage, and the front of the module has an optical fiber cable extending from it or an optical connector that accepts an optical fiber plug.

Accurate alignment among optical fibers, opto-electronic elements, and optical elements is important for proper operation of an optical communication module. Three methods for achieving such alignment are known: active alignment, visual alignment, and passive alignment. In active alignment, a light source is activated, and the signal coupling between the light source and target (i.e., photodiode or optical fiber) is electronically monitored while repositioning the elements with respect to each other until a measured signal indicates maximum coupling efficiency. Active alignment is generally a tedious and uneconomical process because it involves a closed-loop control system, including a set of actuators, an efficient peak search algorithm, and attendant instrumentation.

Visual alignment also functions as a closed loop system but relies on visual cues, such as fiducials or position of the light beam (monitored through an infrared camera), instead of monitoring the magnitude output of the light source. The primary drawbacks to visual alignment are that capital equipment costs escalate rapidly with required placement accuracy, and the throughput can be comparable to that of an active alignment system.

Passive kinematic alignment involves mating elements through accurate physical features. A common example of this is placing a fiber into a silicon submount with an etched V-shaped groove. As silicon is a rigid material in which a V-shaped groove can be very accurately formed by etching, the fiber diameter and accurate dimensions of the V-shaped groove allow for very accurate positional control of the fiber.

A variant of passive alignment is optical self-alignment, in which a force inherent to the system pulls the elements together into proper alignment. An example of optical self-alignment would be the use of surface tension of solder to align a die-attach component such as a laser.

The primary advantages of using passive alignment techniques are the reduction in system and equipment investment and a general reduction in process complexity. The primary obstacle is that the inherent part (e.g., a silicon fiber submount) costs quickly escalate as the required accuracy of part features increases.

SUMMARY

Embodiments of the present invention relate to an optical communication module and method in which a fiber submount in the module is mated with an optics assembly in the module to optically align an optical fiber retained in the fiber submount with an optics element of the optics assembly.

In an exemplary embodiment, the optical communication module comprises a module housing, a fiber submount within the module housing, and an optics assembly within the module housing. The fiber submount has a surface with at least one fiber-receiving groove aligned along a fiber optical axis extending between a rearward end of the fiber submount and a forward end of the fiber submount. The forward end of the fiber submount has a resiliently biased latch portion. The optics assembly has a forward end mated with the forward end of the fiber submount. The optics assembly also has at least one optics element. Each optics element has an optical axis coaxially aligned with a fiber optical axis. The resiliently biased latch portion of the fiber submount provides a resilient retaining force between the optics assembly and the fiber submount. The force retains the optics element in optical alignment with the fiber optical axis.

In the exemplary embodiment, a method for retaining an optical fiber in alignment with an optics element in the above-described optical communication module includes mounting an end of an optical fiber in the fiber-receiving groove, mating a forward end of the optics assembly with a forward end of the fiber submount, and engaging a resiliently biased latch portion at the forward end of the fiber submount with the optics assembly to provide a resilient retaining force that retains the optics element in optical alignment with the fiber optical axis.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
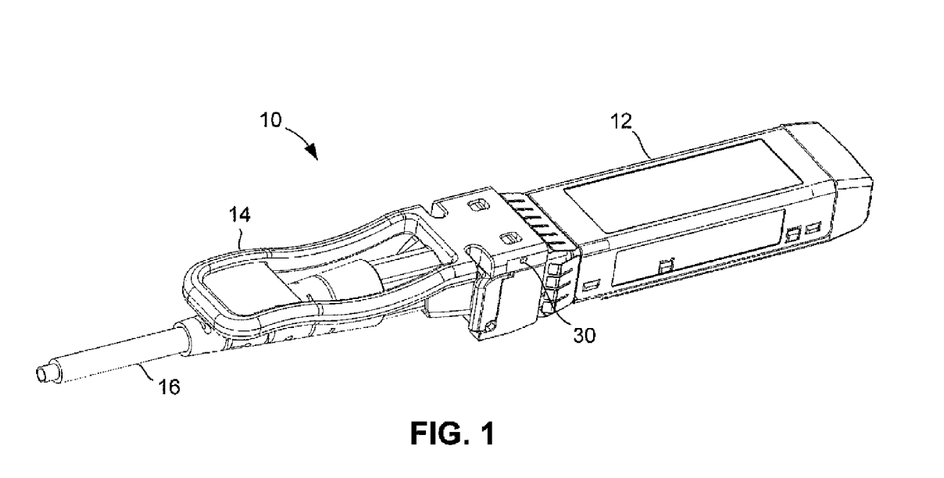
FIG. 1 is a perspective view of an optical communication module, in accordance with an exemplary embodiment of the present invention.
Figure 2:
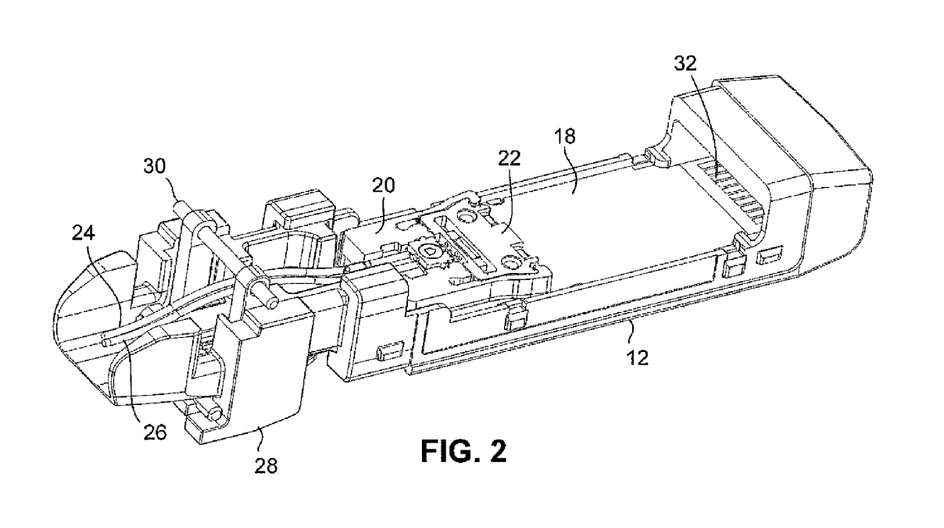
FIG. 2 is a perspective view of the optical communication module of FIG. 1, with the cover removed to reveal the interior structure.

As illustrated in FIGS. 1-2, in an illustrative or exemplary embodiment of the invention, an optical communication module 10 includes a housing 12 and a handle 14. An optical fiber cable 16 extends from an end of housing 12. As illustrated in FIG. 2, within a portion of housing 12 are a printed circuit board 18, a fiber submount 20 and an optics assembly 22. The ends of two optical fibers 24 and 26 of optical fiber cable 16 are retained within fiber submount 20 in a manner described below. A nose portion 28 of housing 12 connects handle 14 (FIG. 1) to the remainder of housing 12 via a pivot pin 30. Although not shown for purposes of clarity, printed circuit board 18 includes electrical conductors and electronic devices, such as one or more integrated circuit chips, which communicate electrical signals via an array of electrical contact fingers 32 on printed circuit board 18. The configuration of housing 12 and the manner in which fiber submount 20 and optics assembly 22 are mounted therein are intended to be exemplary only, and in other embodiments (not shown) such a fiber submount and optics assembly can be mounted in any other suitable manner in any other type of optical communication module housing.

Figure 3:
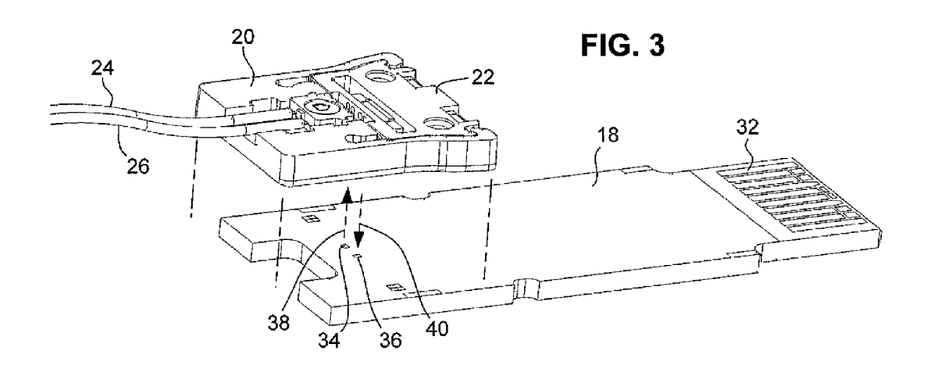
FIG. 3 is a perspective partially exploded view of the fiber submount, optics assembly and printed circuit board of the optical communication module of FIGS. 1-2.
Figure 4:
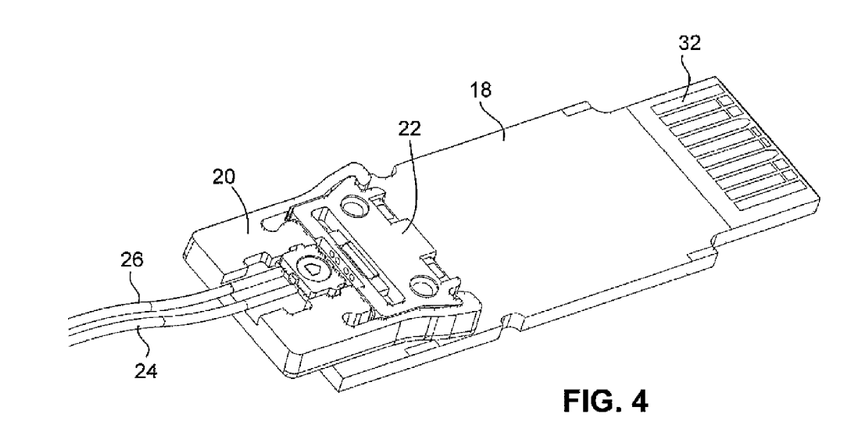
FIG. 4 is similar to FIG. 3, showing the assembled fiber submount, optics assembly and printed circuit board.

As illustrated in FIGS. 3-4, fiber submount 20 and optics assembly 22 together define a structure having a substantially flat or card-shaped profile that mounts on the upper surface of printed circuit board 18. That is, the lower surfaces of fiber submount 20 and optics assembly 22 are substantially coplanar and lay flat on the upper surface of printed circuit board 18. A light source 34 (FIG. 3), such as a laser, and a light detector 36, such as a photodiode, are mounted on the surface of printed circuit board 18. As described in further detail below, in operation, a transmit optical beam 38 is communicated between light source 34 and optics assembly 22, and a receive optical beam 40 is communicated between optics assembly 22 and light detector 36. Although not shown for purposes of clarity, the bottom or lower surface of optics assembly 22 has a recess or cavity that accommodates light source 34 and light detector 36. Although the exemplary optical communication module 10 includes two opto-electronic devices comprising light source 34 and light detector 36, other embodiments can include any other type and number of opto-electronic devices. Accordingly, although the exemplary optical communication module 10 is a transceiver having both light source 34 and light detector 36, in other embodiments such an optical communication module can be an optical transmitter having one or more light sources and no light detectors or, in still other embodiments, an optical receiver having one or more light detectors and no light sources.

Figure 5:
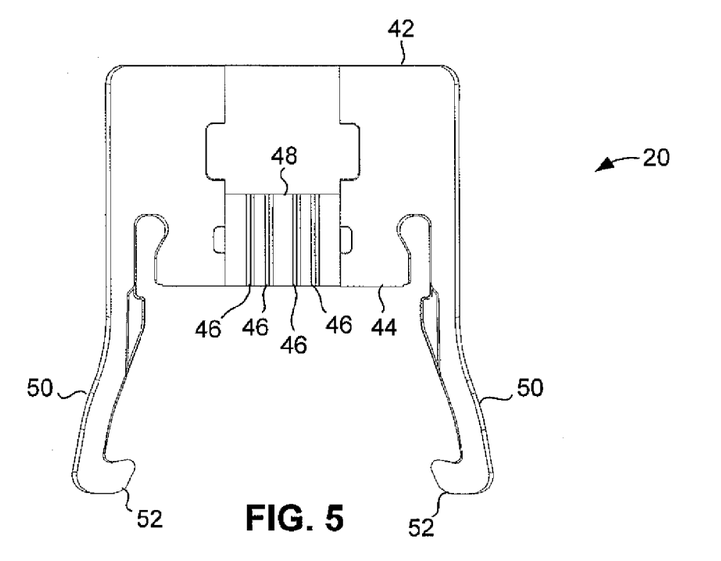
FIG. 5 is a top plan view of the fiber submount.

As illustrated in FIG. 5, fiber submount 20 has a rearward end 42 and a forward end 44. Four V-shaped fiber-receiving grooves 46 are formed in a surface 48 on the top side of fiber submount 20 and extend to forward end 44. Although in the exemplary embodiment there are four V-shaped fiber-receiving grooves 46, in other embodiments there can be any other number of such grooves.

Forward end 44 includes two resiliently biased latch portions comprising resiliently deflectable arms 50. Resiliently deflectable arms 50 extend forward of forward end 44 and have hooked ends 52. Although in the exemplary embodiment the resiliently biased latch portions comprise resiliently deflectable arms 50, in other embodiments such resiliently biased latch portions can comprise any other suitable type of latching structure having resilient (i.e., spring-like) bias force-producing properties. Also, in the exemplary embodiment it should be noted that resiliently deflectable arms 50 are unitary with the remaining portions of fiber submount 20. That is, resiliently deflectable arms 50 and the remaining portions of fiber submount 20 are portions of the same unitary piece of plastic. For example, fiber submount 20, including its resiliently deflectable arms 50, can be formed by injection molding or a similar process for forming one-piece parts.

Figure 6:
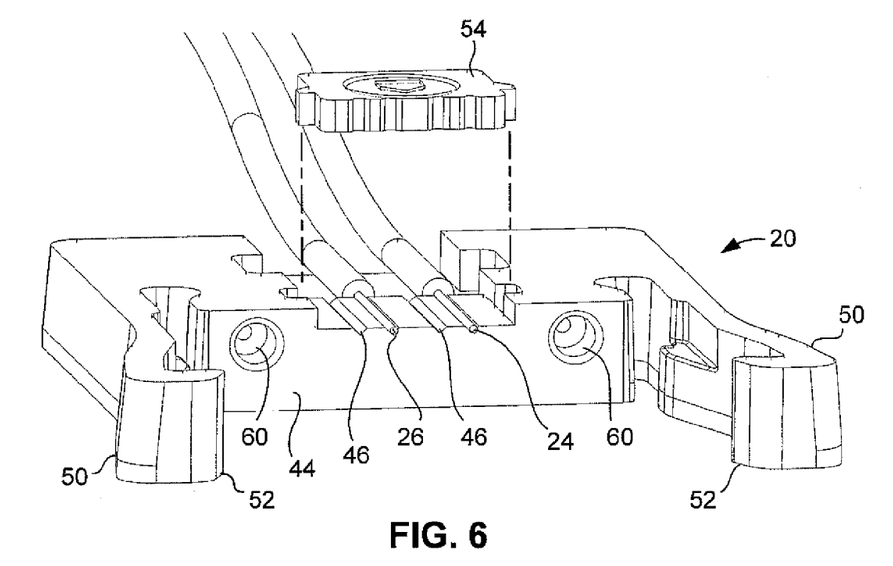
FIG. 6 is a perspective partially exploded view of the fiber submount and cover, with the optical fibers retained therein.
Figure 7:
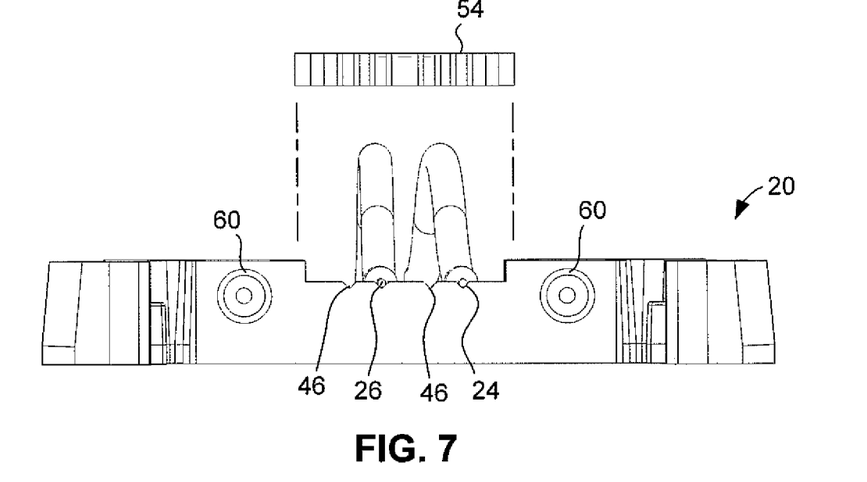
FIG. 7 is a partially exploded front elevation view of the fiber submount and cover.
Figure 8:
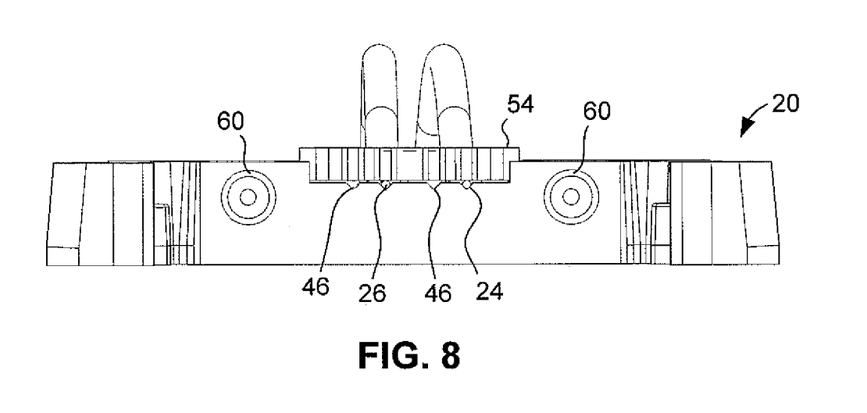
FIG. 8 is similar to FIG. 7, showing the assembled fiber submount and cover.

As illustrated in FIGS. 6-8, the ends of optical fibers 24 and 26 are received in respective V-shaped fiber-receiving grooves 46. A cover 54 is mounted over surface 48 in which V-shaped fiber-receiving grooves 46 are formed. The underside of cover 54 contacts or rests upon optical fibers 24 and 26, thereby retaining them within V-shaped fiber-receiving grooves 46 in the manner shown in FIG. 8.

Figure 9:
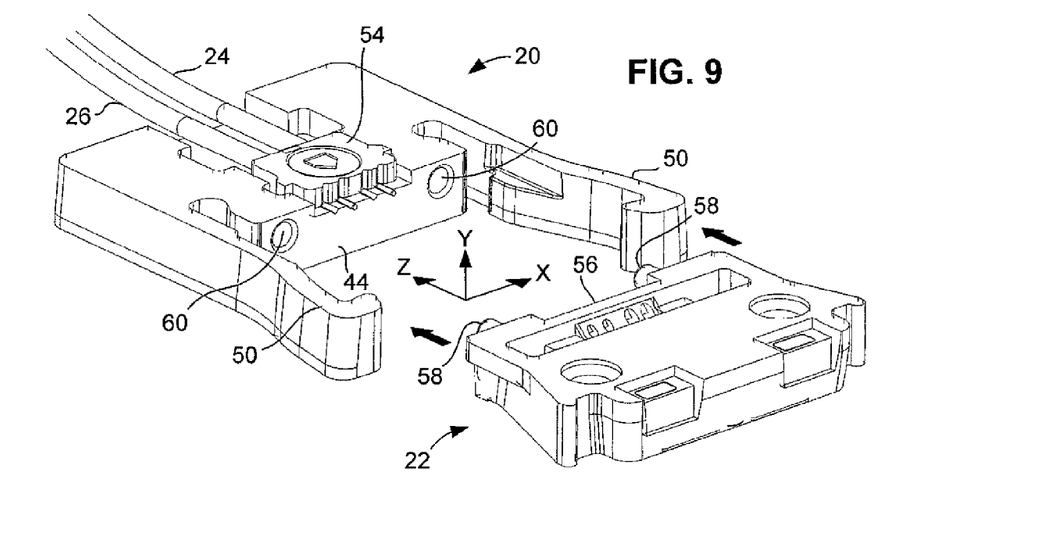
FIG. 9 is a perspective view illustrating mating of the fiber submount and optics assembly.
Figure 10:
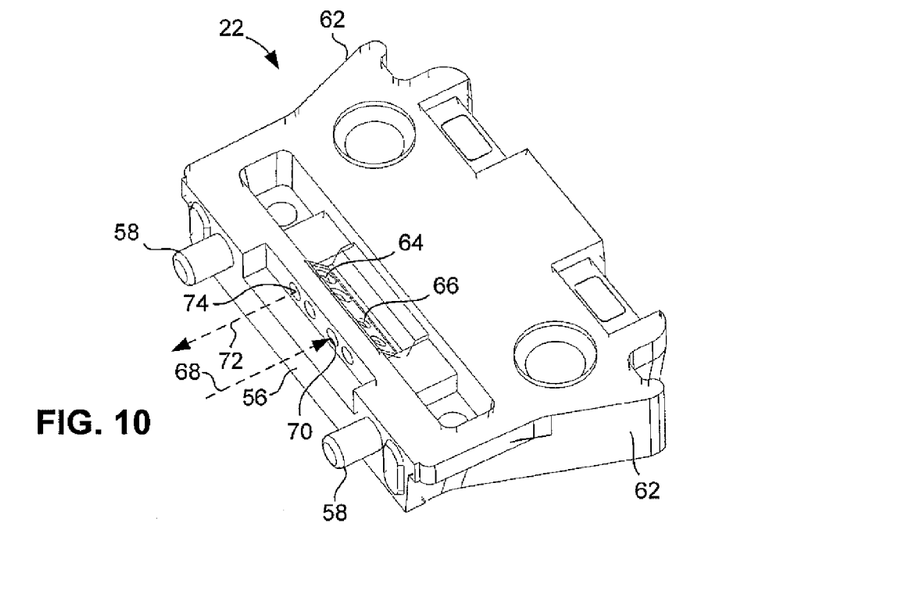
FIG. 10 is a perspective view of the optics assembly.
Figure 11:
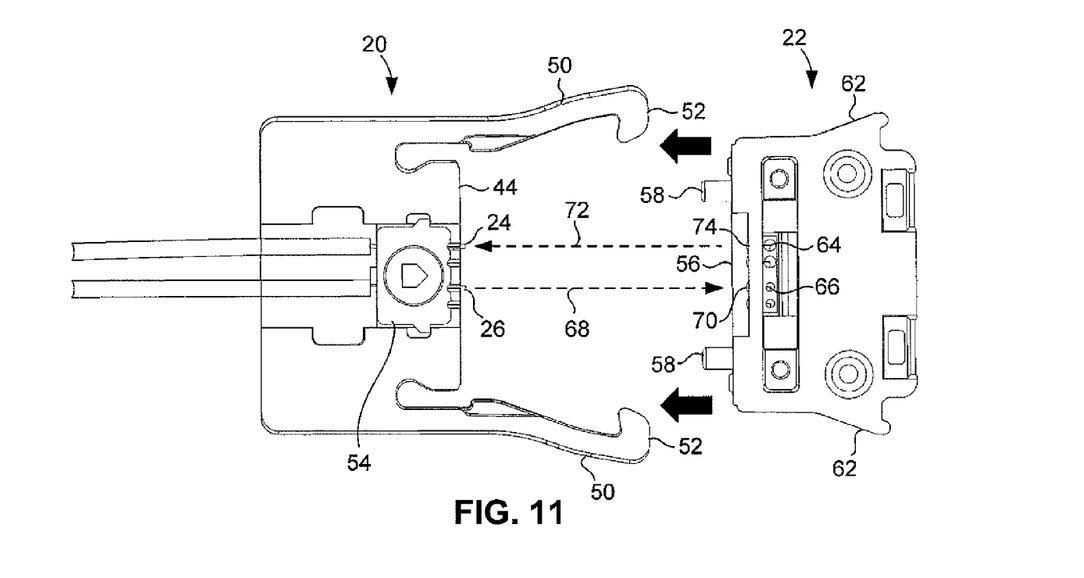
FIG. 11 is a top plan view illustrating mating of the fiber submount and optics assembly.

In accordance with an exemplary method for retaining optical fibers 24 and 26 in optical alignment in optical communication module 10, a method step comprises mounting the ends of optical fibers 24 and 26 in V-shaped fiber-receiving grooves 46 and securing them with cover 54 in the manner described above. As illustrated in FIGS. 9 and 11, a further method step comprises mating a forward end 56 of optics assembly 22 with forward end 44 of fiber submount 20 by orienting optics assembly 22 and fiber submount 20 as shown and moving them closer to each other in the direction of the arrows. As indicated in FIG. 9, this direction corresponds to a z-axis in a coordinate system having three mutually perpendicular axes x, y, and z. As illustrated in FIGS. 9-11, forward end 56 of optics assembly 22 has two substantially cylindrical projections 58, while forward end 44 of fiber submount 20 has two cavities or bores 60 (FIG. 9) having a shape complementary to the shape of projections 58. As fiber submount 20 and optics assembly 22 are moved closer together, two ramp-shaped protrusions 62 on the sides of optics assembly 22 deflect resiliently deflectable arms 50 outwardly (substantially in the x-axis direction) in a camming manner, as indicated in broken line in FIG. 12. As fiber submount 20 and optics assembly 22 are moved nearly into the fully mated position, hooked ends 52 of resiliently deflectable arms 50 slide over and behind protrusions 62. The outward (substantially x-axis) flexure of resiliently deflectable arms 50 generates a correspondingly inward (substantially x-axis) force that urges hooked ends 52 inwardly behind protrusions 62.

Figure 12:
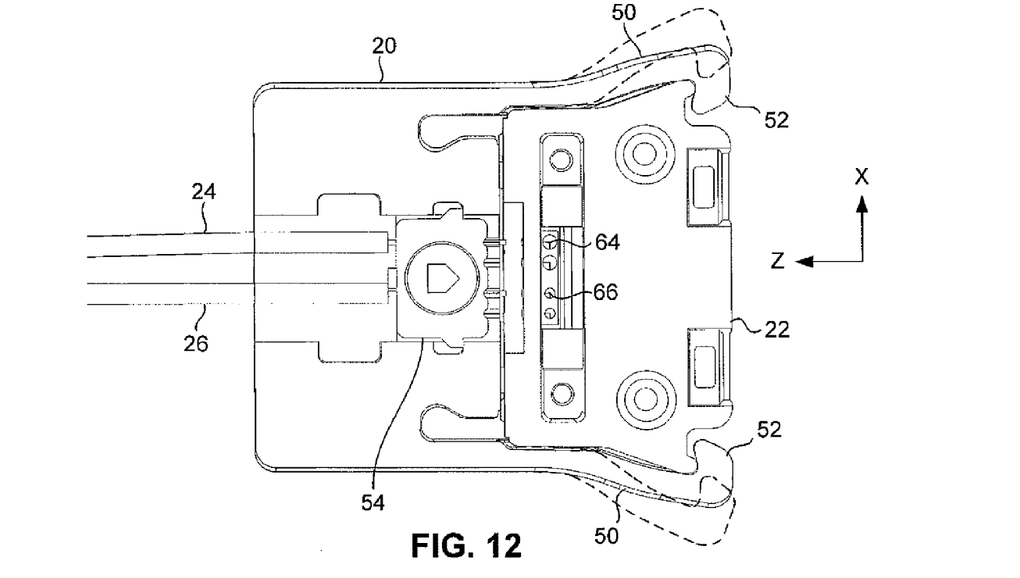
FIG. 12 is similar to FIG. 7, showing the fiber submount and optics assembly in a fully mated position.

When fiber submount 20 and optics assembly 22 are in the fully mated position shown in solid line in FIG. 12, hooked ends 52 engage the rear portions of protrusions 62, thereby retaining fiber submount 20 and optics assembly 22 against relative movement in the z-axis direction. Also, in the fully mated position projections 58 of optics assembly 22 extend into bores 60 of fiber submount 20. There is a nominal fit between the corresponding or mating surfaces of projections 58 and optics assembly 22. The term "nominal fit" is well understood in the art as meaning that there is a minute amount of clearance between the mating surfaces. However, the opposing forces exerted by resiliently deflectable arms 50 in the x-axis direction inhibit assembly shift and promote centering of projections 58 within bores 60. Note that when fiber submount 20 and optics assembly 22 are in the fully mated position, the end of optical fiber 24 is aligned along an optical axis (in the z-axis direction) with a first reflective element 64 of optics assembly 22, and the end of optical fiber 26 is similarly aligned along another optical axis with a second reflective element 66 of optics assembly 22. Reflective elements 64 and 66 can be, for example, total internal reflection (TIR) mirrors formed in a surface angled at 45 degrees with respect to the y and z axes. As such reflective elements are well understood in the art, they are not described in further detail herein. Although in the exemplary embodiment optics assembly 22 includes first and second reflective elements 64 and 66, in other embodiments such an optics assembly can include any other type and number of optics elements, such as, for example, lenses.

Note that the optical axis along which the end of optical fiber 24 is aligned corresponds to the nominal direction from which light can enter the end face of optical fiber 24. Likewise, the optical axis along which the end of optical fiber 26 is aligned corresponds to the nominal direction from which light can be emitted from the end face of optical fiber 26.

In operation, an optical beam 68 emitted from the end face of optical fiber 26 enters an optical port 70 (FIGS. 10-11) at forward end 56 of optics assembly 22 and impinges upon second reflective element 66. Second reflective element 66 redirects optical beam 68 at a 90-degree angle. The redirected beam emerges from beneath optics assembly 22 as receive optical beam 40 (FIG. 3). As described above with regard to FIG. 3, receive optical beam 40 impinges upon light detector 36. Light detector 36 converts the optical signal into an electrical signal. Circuitry (not shown) on printed circuit board 18 processes this electrical signal, and the resulting electrical signals are output via electrical contact fingers 32. Similarly, as described above with regard to FIG. 3, circuitry (not shown) on printed circuit board 18 processes (e.g., amplifies) electrical signals received via electrical contact fingers 32 and drives light source 34. Light source 34 emits transmit optical beam 38 in response to these electrical signals. Transmit optical beam 38 impinges upon first reflective element 64 (FIGS. 10-11), which redirects transmit optical beam 38 at a 90-degree angle. The redirected beam 72 emerges from another optical port 74 in forward end 56 of optics assembly 22. Optical ports 70 and 74 can include lenses for focusing or collimating the respective beams 72 and 68. The above-described latching action and associated retaining forces retain optics elements 64 and 66 in optical alignment with the optical axes of the ends of respective optical fibers 24 and 26.

One or more illustrative embodiments of the invention have been described above. However, it is to be understood that the invention is defined by the appended claims and is not limited to the specific embodiments described.

What is claimed is:

1. An optical communication module, comprising:
   a module housing comprising a nose portion, an interior structure, and a first cover that covers the interior structure;
   a handle;
   one or more pivot pins for attaching the handle to the nose portion of the module housing;
   a circuit board located within the interior structure of the module housing;
   a fiber submount mounted on the circuit board within the module housing, the fiber submount having a fiber submount body monolithically formed as a first single piece of plastic material, the fiber submount body having a rearward end and a forward end, the fiber submount body having a surface with at least a first fiber-receiving groove integrally formed therein for accommodating an optical fiber, the first fiber-receiving groove aligned along a first fiber optical axis and extending to the forward end of the fiber submount body, wherein a resiliently-biased latch portion is formed in the first single piece of plastic material in the forward end of the fiber submount body;
   a second cover that covers the fiber submount, the second cover having an underside in contact with the optical fiber for retaining the optical fiber within the first fiber-receiving groove; and
   an optics assembly mounted on the circuit board within the module housing, the optics assembly having an optics assembly body monolithically formed as a second single piece of plastic material, and having a forward end of the optics assembly body mated with the forward end of the fiber submount body, the optics assembly having at least a first optics element with a first optics element optical axis coaxially aligned with the first fiber optical axis, the resiliently-biased latch portion of the fiber submount body providing a resilient retaining force between the optics assembly and the fiber submount and retaining the first optics element in optical alignment with the first fiber optical axis.

2. The optical communication module of claim 1, wherein the resiliently-biased latch portion comprises a plurality of resiliently deflectable arms extending from the forward end of the fiber submount body to a rearward end of the optics assembly body and configured to exert a resilient force in a direction corresponding to the first fiber optical axis to urge the fiber submount and optics assembly together.

3. The optical communication module of claim 1, wherein the first fiber-receiving groove is V-shaped.

4. The optical communication module of claim 1, wherein:
   the fiber submount body has a submount lower surface that is mounted on an upper surface of the circuit board; and
   the optics assembly body has an optics assembly lower surface substantially coplanar with the submount lower surface and mounted on the upper surface of the circuit board.

5. The optical communication module of claim 4, wherein:
   the first optics element comprises a first reflective element configured to reflect an optical beam between the first optics element optical axis and a first opto-electronic device optical axis; and
   a first opto-electronic device mounted on the upper surface of the electronic circuit substrate in alignment with the first opto-electronic device optical axis.

6. The optical communication module of claim 5, wherein the first reflective element reflects the optical beam at a non-zero degree angle between the first optics element optical axis and the first opto-electronic device optical axis.

7. The optical communication module of claim 1, further comprising:
   an alignment system that aligns and mates the forward end of the optics assembly with the forward end of the fiber submount, wherein the alignment system comprises at least a first projection extending into a first cavity having a shape complementary to a shape of the first projection, the forward end of the fiber submount having the first cavity therein and the forward end of the optics assembly having the first projection thereon.

8. The optical communication module of claim 1, wherein the second cover has at least a first mating feature integrally formed therein that mates with at least a first mating feature integrally formed in the fiber submount body.

9. The optical communication module of claim 1, wherein an upper surface of the fiber submount assembly is substantially coplanar with an upper surface of the optics assembly.

10. The optical communication module of claim 1, wherein the module housing conforms to a small form factor pluggable (SFP) configuration.

11. An optical communication module, comprising:
a module housing comprising a nose portion, a base portion, and a detachable first cover for covering the base portion;
a handle;
one or more pivot pins for attaching the handle to the nose portion of the module housing;
a circuit board mounted in the base portion of the module housing;
a first submount mounted on an upper surface of the circuit board within the module housing, the fiber submount having a fiber submount body monolithically formed as a first single piece of plastic material, the fiber submount body having a rearward end and a forward end, the fiber submount body having a surface with at least a first fiber-receiving groove integrally formed therein for accommodating an optical fiber, the first fiber-receiving groove aligned along a first fiber optical axis and extending to the forward end of the fiber submount body, wherein a resiliently-biased latch portion is formed in the first single piece of plastic material in the forward end of the fiber submount body, the fiber submount body having at least a first mating feature on or in the forward end thereof;
a second cover that covers the fiber submount, the second cover having an underside in contact with the optical fiber for retaining the optical fiber within the first fiber-receiving groove; and
an optics assembly mounted on the upper surface of the circuit board, the optics assembly having an optics assembly body monolithically formed as a second single piece of plastic material, the optics assembly body having at least a first mating feature on or in a forward end thereof that is mated with the first mating feature of the fiber submount body, the optics assembly having at least a first optics element with a first optics element optical axis coaxially aligned with the first fiber optical axis, the resiliently-biased latch portion of the fiber submount providing a resilient retaining force between the optics assembly and the fiber submount that maintains the mating of the first mating features with one another to ensure to maintain optical alignment between the first optics element and the first fiber optical axis.

12. The optical communication module of claim 11, wherein the resiliently-biased latch portion comprises a plurality of resiliently deflectable arms extending from the forward end of the fiber submount body to a rearward end of the optics assembly and configured to exert a resilient force in a direction corresponding to the first fiber optical axis to urge the fiber submount and optics assembly together.

13. The optical communication module of claim 11, wherein the second cover has at least a first mating feature integrally formed therein that mates with at least a first mating feature integrally formed in the fiber submount body.

14. The optical communication module of claim 11, wherein the fiber submount body has a submount lower surface that is in contact with and substantially coplanar with the upper surface of the circuit board, and wherein the optics assembly body has an optics assembly lower surface that is in contact with and substantially coplanar with the upper surface of the electronic circuit substrate.

15. The optical communication module of claim 11, wherein the first optics element comprises a first reflective element configured to reflect an optical beam between the first optics element optical axis and a first opto-electronic device optical axis, and wherein the optical communication module further comprises a first opto-electronic device mounted on the upper surface of the circuit board in alignment with the first opto-electronic device optical axis.

16. The optical communication module of claim 15, wherein the first reflective element reflects the optical beam at a non-zero degree angle between the first optics element optical axis and the first opto-electronic device optical axis.

17. The optical communication module of claim 16, wherein the non-zero degree angle is 90 degrees.

* * * * *